United States Patent
Prouff et al.

(10) Patent No.: US 9,722,773 B2
(45) Date of Patent: *Aug. 1, 2017

(54) METHOD OF DETERMINING A REPRESENTATION OF A PRODUCT OF A FIRST ELEMENT AND A SECOND ELEMENT OF A FINITE SET, METHOD OF EVALUATING A FUNCTION APPLIED TO AN ELEMENT OF A FINITE SET AND ASSOCIATED DEVICES

(75) Inventors: Emmanuel Prouff, Paris (FR); Matthieu Rivain, Paris (FR)

(73) Assignee: OBERTHUR TECHNOLOGIES, Levallois-Perret (FR)

( * ) Notice: Subject to any disclaimer, the term of this patent is extended or adjusted under 35 U.S.C. 154(b) by 321 days.

This patent is subject to a terminal disclaimer.

(21) Appl. No.: 13/116,431

(22) Filed: May 26, 2011

(65) Prior Publication Data

US 2011/0293088 A1 Dec. 1, 2011

(30) Foreign Application Priority Data

May 26, 2010 (FR) ..................................... 10 02213

(51) Int. Cl.
*H04L 9/00* (2006.01)
(52) U.S. Cl.
CPC .......... *H04L 9/002* (2013.01); *H04L 2209/04* (2013.01)
(58) Field of Classification Search
None
See application file for complete search history.

(56) References Cited

U.S. PATENT DOCUMENTS

| | | | | |
|---|---|---|---|---|
| 7,334,133 B2* | 2/2008 | Goubin | .......................... | 713/190 |
| 7,970,129 B2* | 6/2011 | Trichina | .......................... | 380/28 |
| 8,422,668 B1* | 4/2013 | Thichina | .......................... | 380/28 |
| 2006/0002548 A1* | 1/2006 | Chu | .............................. | 380/28 |
| 2006/0120527 A1* | 6/2006 | Baek | .............................. | 380/252 |
| 2007/0140478 A1* | 6/2007 | Komano | ................ | H04L 9/003 |
| | | | | 380/28 |

(Continued)

OTHER PUBLICATIONS

Svetla N. et al.: "Secure Hardware Implementation of Non-linear Functions in the presence of Glitches", Dec. 3, 2008, Information Security and Cryptology A ICISC 2008, Springer Berlin Heidelberg, Berlin, Heidelberg pp. 218-234, XP019115797, ISBN: 978-3-642-00729-3, Section 3 and 4, Cited in French Search Report.

(Continued)

*Primary Examiner* — Farid Homayounmehr
*Assistant Examiner* — Henry Tsang
(74) *Attorney, Agent, or Firm* — Young & Thompson

(57) ABSTRACT

A method for determining a representation of a product of a first element and a second element is disclosed comprising, picking a random value for each pair of a first integer between 1 and d and a second integer greater than the first integer, adding the random value to the product of a first value and a second value, and adding the result of the first addition and the product of the first value and the second value. Then summing, for each integer between 1 and d, a product of the first and second values associated with the integer, the random values associated with the pairs of which the first integer is the integer concerned, and the values obtained for the pairs of which the second integer is the integer concerned.

14 Claims, 1 Drawing Sheet

(56) References Cited

U.S. PATENT DOCUMENTS

2007/0273408 A1* 11/2007 Golic ..................... G06F 7/584
326/93
2007/0286413 A1* 12/2007 Derouet ................ H04L 9/004
380/28

OTHER PUBLICATIONS

Kai S. et al.: "Higher Order Masking of the AES", Jan. 1, 2005, Topics in Cryptology-CT-RSA 2006: The Cryptographers' Track at the RSA Conference 2006, San Jose, CA, USA, Feb. 13-17, 2006; Proceedings;[Lecture Notes in Computer science], Springer, Berlin, DE, pp. 208-225, XP019026783, ISBN: 978-3-540-31033-4, Section 3; figure 8, Cited in French Search Report.

French Search Report, dated Feb. 23, 2011, from corresponding French application.

* cited by examiner

METHOD OF DETERMINING A REPRESENTATION OF A PRODUCT OF A FIRST ELEMENT AND A SECOND ELEMENT OF A FINITE SET, METHOD OF EVALUATING A FUNCTION APPLIED TO AN ELEMENT OF A FINITE SET AND ASSOCIATED DEVICES

CROSS-REFERENCE TO RELATED APPLICATION

This application claims priority to French application No. 10/02213 filed May 26, 2010.

BACKGROUND OF THE INVENTION

The invention concerns a method of determining a representation of a product of elements of a finite field each represented by a plurality of values, as well as a method of evaluating a function using the aforementioned determining method and associated devices.

In order to avoid malicious persons being able, through the observation of an electronic circuit, to deduce data that is manipulated by that circuit (principally in the field of cryptography), it is known to mask the manipulated data by means of a random value (typically by combination of the data to process and the random value by means of an exclusive or operation, also named XOR) such that the data actually manipulated by the electronic device differ at each execution of the algorithm concerned, even when the attacker purposefully attempts to reproduce the algorithm identically.

On account of its properties, the masking operation may be seen as an addition within the set formed by all the possible data, typically the set of words of n bits, in which case the set is a Galois field commonly designated $F_{2^n}$.

In order to combat the attacks even more effectively, it has been provided to use several masks to mask the same item of data, typically such that the sum (by means of the XOR operation) of the masked item of data and of the set of the masks enables the original item of data to be retrieved.

The original item of data is then in a way represented during the computations by d values (of which d−1 values come from random picking and of which the sum is equal to the original, i.e. not masked, item of data).

The processing of such data represented by a plurality of values must be such that the operations applied to those values in the end result in the desired processing for the sum of those values, which does not pose any difficulty when the function to apply is linear with respect to the operation of addition (since it then suffices to apply the desired processing to each of the values representing the item of data in order to obtain the different values representing the result of the operation).

A difficulty does arise on the other hand when a non-linear function is to be applied, as is the case for example in the context of the AES algorithm.

In context of the implementation of such functions by means of Boolean circuits, the paper "*Private circuits: securing hardware against probing attacks*", by Y. Ishai et al., in Crypto 2003, LNCS 2729, pp. 463-481, 2003 proposes to secure AND gates by using a plurality of binary random values.

Any function implemented using wired logic, which may be a non-linear function the case arising, may thus be rendered secure, at the cost however of an increase in the area of silicon used.

This solution is not moreover applicable in practice to a software implementation of the function to be applied to the data (processing bit by bit in software form being of very low efficiency), although such an implementation may be preferable for other reasons. Such an implementation for example makes it possible in particular to avoid the presence of observable electrical phenomena (such as delays) linked to performing the masking by a circuit (which phenomena are named "glitches"), which make certain attacks possible or require the implementation of onerous counter-measures (such as additional synchronization circuits).

SUMMARY OF THE INVENTION

In this context, the invention provides a method, implemented by an electronic circuit, for determining a representation of the product of a first element and of a second element of a finite set with cardinality strictly greater than two and in which are defined an addition and a multiplication that is commutative and distributive with respect to that addition, the first element being represented by a plurality of d first values of which the sum is equal to the first element and which are each associated with an integer comprised between 1 and d, the second element being represented by a plurality of d second values of which the sum is equal to the second element and which are each associated with an integer comprised between 1 and d, comprising the following steps:

for each pair formed by a first integer comprised between 1 and d and a second integer strictly greater than the first integer, obtaining a value by means of the following sub-steps:

picking a random value associated with the pair;

performing a first addition of said random value and of the product of the first value associated with the first integer and of the second value associated with the second integer;

performing a second addition of the result of the first addition and of the product of the first value associated with the second integer and of the second value associated with the first integer;

for each integer comprised between 1 and d, determining the value associated with the integer concerned in said representation by summing the product of the first and second values associated with the integer concerned, the random values associated with the pairs of which the first integer is the integer concerned and the values obtained for the pairs of which the second integer is the integer concerned.

It is thus provided to use a multiplication between elements of the set, that is to say between items of data; any function, for example non-linear, on the set may be written in a form using such multiplications as explained later. The method provided above enables such multiplication to be used between two $(d-1)^{th}$ order masked elements, without compromising the masking used. To be precise, in the context of a masking process, the first values may be respectively seen as a masked item of data (here the first masked element) and a plurality of masks (here d−1 masks); similarly, the second values may be considered respectively as another item of masked data (here the second masked element) and another plurality of masks (here d−1 masks).

It is to be noted that the definition given above provides for associating values with integers comprised between 1 and d (in other words of identifying values with indices varying from 1 to d) whereas the following description uses indexation varying from 0 to d−1. Naturally the indices used in practice are merely parts of one implementation of the invention, which is not limited to a particular indexation. The association of the different values with integers comprised between 1 and d, as provided in the claims, includes any indexation that may be envisaged in practice.

The addition is for example an operation of exclusive or type. Furthermore, the multiplication may be a multiplication of polynomials having binary coefficients followed by a step of reducing by an irreducible polynomial having binary coefficients. As a variant the multiplication may be defined as follows: each element of the finite set being a given power of a primitive element, the multiplication may then be carried out by adding the exponents respectively associated with the powers to multiply, modulo the cardinality of the field less one.

In practice, the product of two elements of the set is for example obtained by reading, from a table stored in memory, an element associated with said two elements.

Being masks, (d−1) values from among the d first values are for example obtained by random picking.

The method provided here is typically implemented by an electronic circuit, for example by a microprocessor, with the advantages associated with such implementation; as a variant, it could be an application specific integrated circuit. The first element and the second element are typically items of data each coded over a plurality of bits and manipulated by the microprocessor.

The set may be a Galois field $F_2^n$, with n greater than or equal to 2, for example equal to 8.

As already indicated, as any function can be written in a form using multiplications, the invention furthermore provides a method of evaluating a function applied to an element of a finite set, characterized in that it comprises determining a plurality of values representing the result of the application of a polynomial to said element, said determining including at least one step of determining the representation of the product of multiplying said element by itself in accordance with what has just been stated.

The function may be non-linear with respect to the addition, in which case the use of the methods which have just been described is particularly advantageous.

The invention also provides a device for determining a representation of the product of a first element and of a second element of a finite set with cardinality strictly greater than two and in which are defined an addition and a multiplication that is commutative and distributive with respect to that addition, the first element being represented by a plurality of d first values of which the sum is equal to the first element and which are each associated with an integer comprised between 1 and d, the second element being represented by a plurality of d second values of which the sum is equal to the second element and which are each associated with an integer comprised between 1 and d, comprising:

means for obtaining a value, for each pair formed by a first integer comprised between 1 and d and a second integer strictly greater than the first integer:
  by picking a random value associated with the pair;
  by performing a first addition of said random value and of the product of the first value associated with the first integer and of the second value associated with the second integer;
  by performing a second addition of the result of the first addition and of the product of the first value associated with the second integer and of the second value associated with the first integer;
 means for determining, for each integer comprised between 1 and d, the value associated with the integer concerned in said representation by summing the product of the first and second values associated with the integer concerned, the random values associated with the pairs of which the first integer is the integer concerned and the values obtained for the pairs of which the second integer is the integer concerned.

Lastly, the invention provides a device for evaluating a function applied to an element of a finite set by determining a plurality of values representing the result of the application of a polynomial to said element, comprising such a device for determining the representation of the product of multiplying said element by itself.

BRIEF DESCRIPTION OF THE SEVERAL VIEWS OF THE DRAWINGS

Other features and advantages of the invention will appear in the light of the following description, made with reference to the accompanying drawings in which.

DETAILED DESCRIPTION OF THE INVENTION

Figure 1:
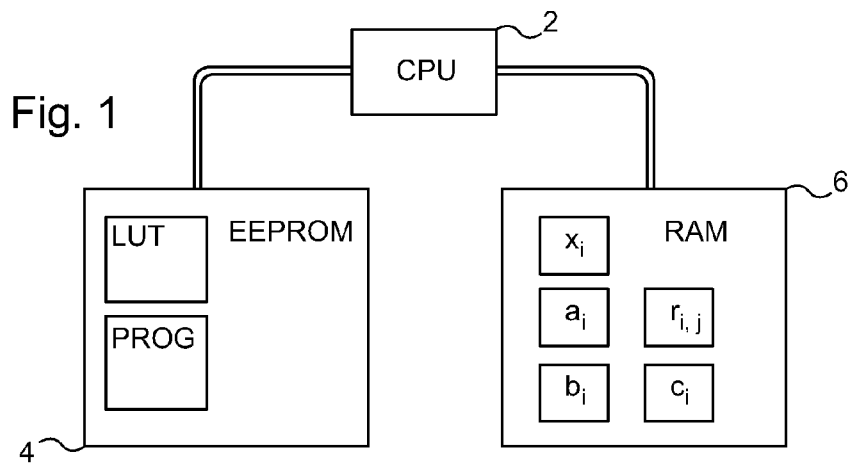
FIG. 1 represents an example of a device capable of implementing the invention.

FIG. 1 represents the main components of a device adapted to implement the method provided by the invention;

This device comprises a microprocessor 2 connected (via suitable buses) to a rewritable memory 4 (typically of EEPROM type) and to a random access memory 6.

The device of FIG. 1 is for example a micro-computer. As a variant, it could be another type of electronic device, for example a secure electronic device, such as a microcircuit card.

The rewritable memory 4 contains in particular instructions of a computer program PROG which, when they are executed by the microprocessor 2, enable the implementation of the methods provided by the invention, such as the one described below.

The computer program PROG may as a variant be stored on another data carrier (for example a hard disk), which may possibly be removable (for example an optical disc or a removable memory). In this case, the computer program PROG may possibly be transferred first of all into the random access memory 6 before being executed by the microprocessor 2.

At the time of its execution by the microprocessor 2, the computer program PROG implements a cryptographic data processing method which in particular involves an item of data x to process.

The data to process (in particular the item of data x) are represented within the device of FIG. 1 (and in particular within the random access memory 6) by digital words each formed by several bits; for example a representation of the data is used here in the form of 8-bit bytes.

Figure 2:
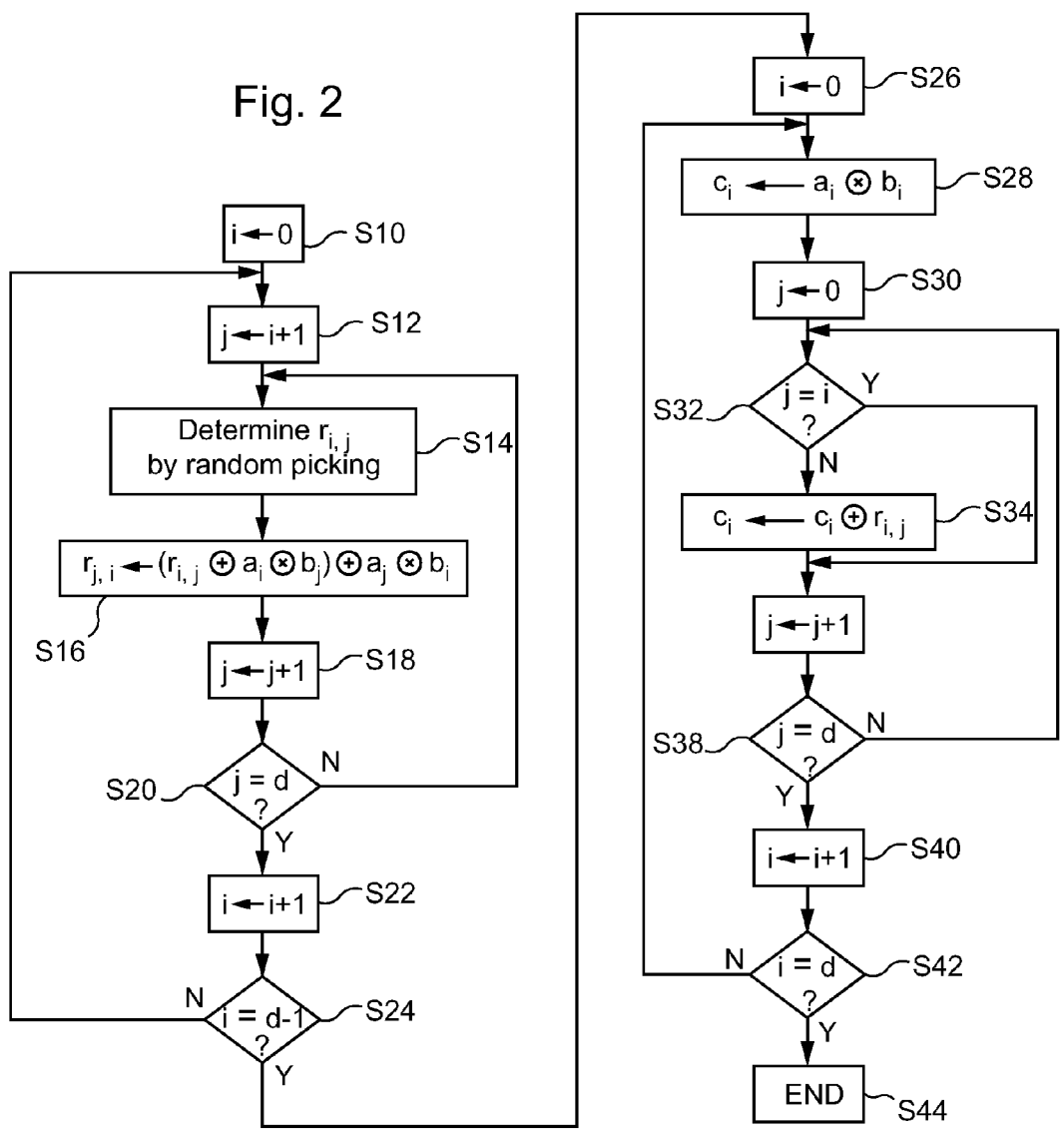
FIG. 2 represents a method implemented by the device of FIG. 1 and which is in accordance with the teachings of the invention.

The random access memory 6 stores the variables and data processed, in particular those manipulated by the method described later with reference to FIG. 2.

In the context of their processing (in particular when cryptographic processing is involved), the data are (each) viewed as elements of a set $F_2^n$ comprising $2^n$ elements and provided with a field structure via the definition of an addition between two elements of the set (denoted ⊕ below) and via the definition a multiplication of two elements of the set (denoted ⊗).

It can be understood that, in the case described here in which the data are represented by 8-bit bytes, the field $F_2{}^n$ comprises 256 elements (n=8).

The addition ⊕ defined over this field is the "exclusive or" or XOR operation (which is a basic operation in processing by the microprocessor 2).

As regards the multiplication ⊗ between two elements (that is to say between two items of data coded over several bits, typically 8 bits), this may be defined as a modular polynomial multiplication, or as the multiplication of two powers of a primitive element (or generator) of the field (in which case, this multiplication amounts to an addition of two exponents of the primitive element modulo $2^n-1$). In this regard, reference may be made to the work "*Finite fields*", volume 20 of the "*Encyclopedia of mathematics and its applications*" by Rudolph Lidl and Harald Niederreiter, Cambridge University Press, $2^{nd}$ edition, 1997.

Whatever the theoretical representation used, the multiplication is implemented here by means of a stored table (stored here in the rewritable memory 4). Such a table, denoted LUT (for "Look-Up Table") stores, for any pair of elements of the field, the result of the multiplication of those elements.

In this context, the processing of an item of data which achieves the transformation of that item of data into another item of data may be viewed as a function of the field on itself (that is to say a function f which associates with every element x of the field, that is to say with all the possible data, an element f(x) of the field, that is to say the item of data obtained by the processing).

In the device of FIG. 1 a masking technique is furthermore used whereby a determined item of data x is manipulated only in a form masked by one or more masks $x_i$ (i>0), typically determined by random picking at the start of processing (that is to say in practice at the start of the algorithm concerned, which it is wished to protect by the masking). The masks may moreover be regenerated if necessary during the course of processing.

The masking used here is successive addition (by application of the XOR operation) of the masks $x_i$ to the item of data x to mask.

Such masking is said to be of higher order when several masks $x_i$ are successively applied to the item of data x.

In this case, the item of data x is as represented while processing by d items of data $x_i$, i.e. the masked item of data $x_0$ and the masks $x_1, X_2, X_{d-1}$. (The masks must indeed be stored to be able to retrieve the value x without masking). This is referred to as masking of order (d-1).

The item of data x is thus represented during the processing by d items of data $x_i$ of which the sum (according to the addition ⊕ defined over the field referred to above) is equal to the item of data x so represented:

$$x_0 \oplus x_1 \oplus x_2 \oplus \ldots \oplus x_{d-1} = x.$$

As already explained in the introduction, on account of the random picking of the masks at each execution of an algorithm, the masking makes it possible to modify the values manipulated at the time of the different executions of the algorithm and makes it difficult (or impossible) to deduce the data actually processed based on observation of the circuit, with the difficulty increasing with the order of masking.

The masking however involves particular processing when, to the item of data x to be processed (and thus in practice to the data $x_i$ that are actually manipulated), a function f is to be applied that is non-linear with respect to the masking operation (here the addition ⊕, performed by an XOR operation). To be precise, contrary to the case of the functions that are linear with respect to that operation, the sum of the results $f(x_i)$ of the application of the function f to the manipulated data $x_i$ is (by the actual definition of the absence of linearity) different from the result f(x) of the application of the function to the item of data x processed.

A method is provided below which, on the basis of the data $x_i$ (where $x_0 \oplus x_1 \oplus x_2 \oplus \ldots \oplus x_{d-1} = x$), enables data $e_i$ to be obtained the sum of which will be equal to f(x) while maintaining the masking of order (d-1) throughout the computation.

It may be noted first of all that the Lagrange interpolation formula makes it possible to define a polynomial p(x) equal to the function f(x) in each element of the set $F_2{}^n$:

$$p(x) = \bigoplus_{a \in F_{2^n}} \left[ f(a) \otimes \prod_{b \in F_{2^n}, b \neq a} \frac{x-b}{a-b} \right],$$

where the multiple product Π uses the multiplication ⊗ and where $$\frac{x-b}{a-b}$$

is the product (in the sense of the multiplication ⊗) of the element (x-b) by the inverse (still in the sense of the multiplication ⊗) of the element (a-b). It may be noted that the formula below is written in its general form (with subtraction), but that, in the sets of type $F_2{}^n$ studied here, the subtraction ("−" symbol above) is also implemented by an XOR operation, denoted here by ⊕, on account of the fact that the application of the XOR operation with a given element (that is to say the addition of a given element) is involutary in this type of set.

According to the above, the function f (in particular when it is non-linear with respect to the addition ⊕) may be written in the form of a polynomial of degree $2^n-1$ and it is thus possible to define the function f by a family of coefficients $\alpha_i$ such that:

$$f(x) = \bigoplus_{i=0}^{2^n-1} [\alpha_i \otimes x^i],$$

where $x^0$ is the identity element relative to the multiplication ⊗, $x^1$ is the element x and, for i>1, $x^i$ is the element x multiplied (i−1) times by itself (by means of the operation ⊗).

The processing of an item of data x by the function f may thus be reduced to a combination of additions ⊕ and multiplications ⊗.

The additions are naturally linear with respect to the masking operation (here constituted by the same XOR operation) and the summing of the different elements concerned may thus be carried out by summing the d manipulated items of data representing those elements.

The same applies for the multiplication by each of the coefficients $\alpha_i$, which is also linear with respect to the masking operation.

However it is necessary to employ a specific method to determine the result of the multiplications to implement (here to obtain powers of the element x to process) while maintaining the masking of order (d−1) on account of the non-linearity of the operation of multiplication with respect to the masking operation.

The method of multiplying a number a (represented by d values $a_i$) and a number b (represented by d values $b_j$) provided to that end is now described with reference to FIG. 2.

It can be understood that in the context of evaluating the function f described above, which is merely one possible application of that method, the items of data a and b are both equal to the item of data x to process.

The method commences at step S10 by the initialization of a variable i to 0.

At step S12 a variable j is then initialized to the value i+1.

At step S14 a variable $r_{i,j}$ is next determined by random picking, typically using a random value generating function implemented in software form and which forms part of the program PROG.

A variable $r_{j,i}$ is next computed at step S16 using the formula: $(r_{i,j} \oplus a_i \otimes b_j) \oplus a_j \otimes b_i$. It may be noted that the index i is necessarily different from the index j in this formula (since j is initialized to i+1 and incremented as indicated later).

It is to be recalled that, using conventional notation, multiplication takes priority over addition and that the multiplications $a_i \otimes b_j$ and $a_j \otimes b_i$ are thus carried out first, before adding the value $r_{i,j}$ to the result of the first multiplication (using an XOR), and lastly adding to that sum the result of the second multiplication.

It is to be noted that compliance with this order for the operations (in particular for the additions) is imperative if it is wished to maintain the security of the masking.

At step S18 the incrementation of the variable j is next carried out.

It is then tested at S20 whether the variable j is equal to d (which, as indicated earlier, represents the number of values representing a value to process).

In the negative (that is to say if values of j between i+1 and d−1 remain that have not been processed), step S14 is looped back to.

In the affirmative, that is to say when the last passage through step S16 was made with a value of the variable j equal to d−1, the following step S22 is proceeded to.

This step S22 consists in incrementing the variable i.

Next, at step S24, it is tested whether the variable i is equal to (d−1). In the negative, step S12 is looped back to which makes it possible to perform the processing already described with an incremented value of i. In the affirmative, all the values $r_{i,j}$ have been processed (since there are no values $r_{i,i}$ to determine, and thus in particular no value $r_{d-1,d-1}$) and the second part of the method is then proceeded to at step S26.

Step S26 consists in initializing the variable i to 0.

Step S28 is next proceeded to at which the product $a_i \otimes b_i$ is computed, which is stored in a variable $c_i$.

Step S30 is then carried out at which the variable j is initialized to 0.

At step S32, equality between the variables i and j is tested.

In the negative, the variable $r_{i,j}$ determined in the first part of the method is added to the variable $c_i$ (by means of the operation $\oplus$). To be precise, the sum $c_i \oplus r_{i,j}$ is computed, which is again stored in the variable $c_i$ (by overwriting).

In the affirmative at step S32 (that is to say if i=j), step S36 is proceeded to directly (that is to say without performing step S34).

Step S34 is also followed by step S36, at which the variable j is incremented.

At step S38 it is then tested whether the variable j is equal to d. In the negative, step S32 is looped back to. In the affirmative, step S40 is proceeded to.

Step S22 consists in incrementing the variable i.

Step S42 is then proceeded to at which it is tested whether the variable i is equal to d.

In the negative, step S28 is looped back to in order to determine the next variable $c_i$.

In the affirmative, all the variables $c_i$ (for i from 0 to d−1) have been determined and the method is thus terminated (step S44).

The d values $c_i$ so obtained represent the product c, which is the result of the multiplication $a \otimes b$, that is to say that:

$$c = a \otimes b \text{ and } c_0 \oplus c_1 \oplus c_2 \oplus \ldots \oplus c_{d-1} = c.$$

It is to be noted that this last equality may be verified as follows by using the properties of commutativity of the multiplication $\otimes$, and of distributivity of the multiplication $\otimes$ with respect to the addition $\oplus$:

$$\bigoplus_{i=0}^{d-1} c_i = \bigoplus_{i=0}^{d-1} \left[ a_i \otimes b_i \oplus \left( \bigoplus_{j \neq i} r_{i,j} \right) \right]$$

thanks to steps S28 to S34, thus $$\bigoplus_{i=0}^{d-1} c_i = \bigoplus_{i=0}^{d-1} \left[ a_i \otimes b_i \oplus \left( \bigoplus_{j > i} r_{i,j} \right) \oplus \left( \bigoplus_{j < i} (r_{j,i} \oplus a_i \otimes b_j \oplus a_j \otimes b_i) \right) \right]$$

according to S16, hence $$\bigoplus_{i=0}^{d-1} c_i = \bigoplus_{i=0}^{d-1} \left[ a_i \otimes b_i \oplus \left( \bigoplus_{j < i} (a_i \otimes b_j \oplus a_j \otimes b_i) \right) \right]$$

since the $r_{i,j}$ cancel each other, i.e.

$$\bigoplus_{i=0}^{d-1} c_i = \left( \bigoplus_{i=0}^{d-1} a_i \right) \otimes \left( \bigoplus_{i=0}^{d-1} b_i \right) = a \otimes b = c.$$

It has thus been made possible to obtain values representing the product c of the values a and b, while maintaining the masking of order (d−1).

The embodiment which has just been described is merely a possible example of implementation of the invention, which is not limited thereto. In particular, the invention is not limited to the case of the field of type $F_{2^n}$ but also applies in the case of other fields (because, as stated above, the solution relies on the rules of commutativity and distributivity in the field).

The invention claimed is:

1. A data masking method, implemented by an electronic circuit, which determines a representation of a product of a first item of data and a second item of data of a finite set with cardinality strictly greater than two and in which are defined an addition and a multiplication that is commutative and distributive with respect to that addition, comprising:
  masking the first item of data to generate a plurality of d first values of which the sum is equal to the first item of data and which are each associated with an integer comprised between 1 and d, the second item of data being represented by a plurality of d second values of which the sum is equal to the second item of data and which are each associated with an integer comprised between 1 and d, comprising the following steps:
  for each pair, formed by a first integer comprised between 1 and d and a second integer strictly greater than the first integer, the first integer being associated with one of said first values and the second integer being associated with one of said second values, obtaining a value by performing the following substeps in an electronic circuit:
    generating a random value utilizing a computational random value generator, and associating the random value with the pair;
    performing a first addition of said random value and of a product of the first value associated with the first integer and of the second value associated with the second integer;
    performing a second addition of the result of the first addition and of a product of the first value associated with the second integer and of the second value associated with the first integer;
  for each integer comprised between 1 and d, determining the value associated with the integer concerned in said representation by summing a product of the first and second values associated with the integer concerned, the random values associated with the pairs of which the first integer is the integer concerned and the values obtained for the pairs of which the second integer is the integer concerned,
  wherein the first item of data is masked from an observer of the electronic circuit, such that it is difficult or impossible for the observer to deduce the first item of data.

2. The data masking method according to claim 1, wherein the first addition and the second addition are an operation of exclusive or type.

3. The data masking method according to claim 1, wherein the multiplication is a multiplication of polynomials having binary coefficients followed by a step of reducing by an irreducible polynomial having binary coefficients.

4. The data masking method according to claim 1, wherein each element of the finite set is a given power of a primitive element and wherein the multiplication is carried out by adding exponents respectively associated with the powers to multiply, modulo the cardinality of the field less one.

5. The data masking method according to claim 1, wherein a product of two items of data of the finite set is obtained by reading, from a table stored in memory, a third item of data associated with said two items of data.

6. The data masking method according to claim 1, wherein (d−1) values from among the d first values are obtained utilizing said random values.

7. The data masking method according to claim 1, implemented in a microprocessor.

8. The data masking method according to claim 1, wherein the first item of data and the second item of data are each coded over a plurality of bits.

9. The data masking method according to claim 1, wherein the finite set is a Galois field $F_2^n$, with n greater than or equal to 2.

10. The data masking method according to claim 9, wherein n is equal to 8.

11. A data masking method that evaluates a function applied to an element of a finite set, characterized in that it comprises determining a plurality of values representing a result of an application of a polynomial to said element of the finite set, said determining comprising applying the method according to claim 1, wherein the first item of data and the second item of data is each set equal to said element of the finite set.

12. The data masking method according to claim 11, wherein the function is non-linear with respect to an addition defined on the finite set.

13. A data masking microprocessor that determines a representation of a product of a first item of data and of a second item of data of a finite set with cardinality strictly greater than two and in which are defined an addition and a multiplication that is commutative and distributive with respect to that addition, the microprocessor being configured to mask the first item of data to generate a plurality of d first values of which the sum is equal to the first item of data and which are each associated with an integer comprised between 1 and d, the second item of data being represented by a plurality of d second values of which the sum is equal to the second item of data and which are each associated with an integer comprised between 1 and d, comprising:
  a value obtaining circuit to obtain a value for each pair formed by a first integer comprised between 1 and d, the first integer being associated with one of said first values, and a second integer, the second integer being associated with one of said second values, strictly greater than the first integer:
    by generating a random value utilizing a computational random value generator, and associating with the random value with the pair;
    by performing a first addition of said random value and of a product of the first value associated with the first integer and of the second value associated with the second integer;
    by performing a second addition of the result of the first addition and of a product of the first value associated with the second integer and of the second value associated with the first integer; and
  a determining circuit to determine for each integer comprised between 1 and d the value associated with the integer concerned in said representation by summing a product of the first and second values associated with the integer concerned, the random values associated with the pairs of which the first integer is the integer concerned and the values obtained for the pairs of which the second integer is the integer concerned;
  wherein the first item of data is masked from an observer of the microprocessor, such that it is difficult or impossible for the observer to deduce the first item of data.

14. A data masking device that evaluates a function applied to an element of a finite set by determining a plurality of values representing a result of an application of a polynomial to said element, comprising a device according to claim 13, wherein each of the first and second item of data is set equal to said element of the finite set.

* * * * *